Oct. 30, 1928.
E. ZIPPER ET AL
DIVIDED RIM
Filed March 7, 1927
1,689,273
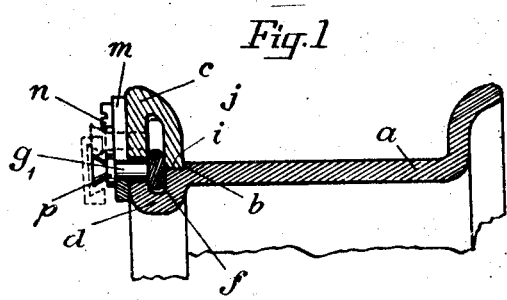
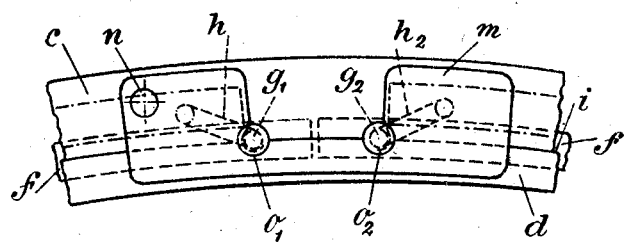
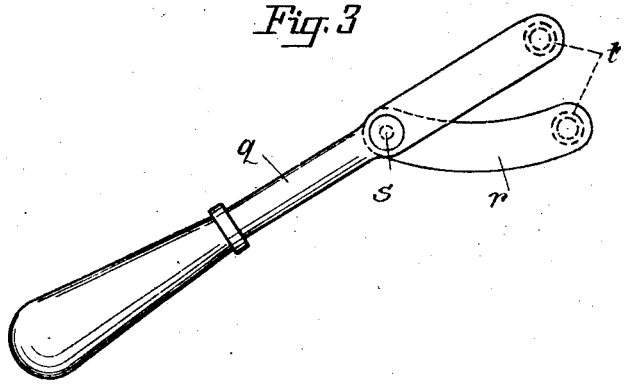
E. Zipper & W. Zipper
INVENTORS
By: Marks & Clark
Attys Patented Oct. 30, 1928.

1,689,273

UNITED STATES PATENT OFFICE.

EMIL ZIPPER AND WALTER ZIPPER, OF VIENNA, AUSTRIA.

DIVIDED RIM.

Application filed March 7, 1927, Serial No. 173,501, and in Austria July 9, 1926.

This invention relates to divided rims for the wheels of automobiles and the like, wherein a removable rim flange is locked by means of an open locking ring engaging in an annular groove in the fixed part of the rim. Such a divided rim is disclosed in our prior application No. 80,059 filed January 8, 1926, wherein this locking ring is constructed as an open steel ring, which is capable of being uniformly expanded or contracted by altering the distance between its ends, and which, by increasing its diameter is lifted out of a locking groove provided on the fixed rim member. The bent-out ends of the locking ring project in that case through recesses in the fixed rim member towards the centre of the wheel and are connected with one another by means of a self-locking closure to be actuated in the manner of a door lock.

The device according to our said prior specification has the disadvantages that a self-locking closure has to be arranged on each wheel, whereby the cost of manufacture is increased, and that the parts of this lock are liable to be fouled by mud from the road. Furthermore the lock projecting towards the centre of the wheel forms an element impairing the symmetry of the wheel.

According to the present invention the above-mentioned disadvantages are obviated owing to the fact that the ends of said ring carry pins which project outwards laterally through oblique guiding slots provided in the removable rim flange and are designed for the mounting of a key constructed in the manner of a double lever and are held fast in the locking position by means of an oscillatable locking plate, which at the same time serves to cover up the slots.

One constructional example of the invention is illustrated in the accompanying drawings, wherein Fig. 1 shows a section through the divided rim parallel to the axis of the wheel, while Fig. 2 shows a side elevation of part of the rim together with the locking device, Fig. 3 shows the double lever serving for actuating the locking device.

As in the case of the divided rim according to our aforementioned prior specification the non-removable wider rim member $a$ is secured in the usual manner to a set of spokes (not shown) or a solid wheel, or constructed as a continuation of the wheel disc. At its outer edge the bottom of the rim is provided with a low step $b$, upon which the removable rim flange $c$ is supported, as shown in Fig. 1, and adjacent to the step $b$ is an annular groove $d$, which is pressed into the rim member $a$. The detachable rim flange $c$ is provided with an annular groove $j$ (Fig. 1), which is open towards the centre of the wheel, and which forms, with the annular groove $d$, in the fixed rim member $a$, a closed annular space which serves for the reception of a resilient steel ring $f$, by means of which the removable rim flange $c$ is locked to the rim member $a$. At the ends of the open locking ring $f$ are provided short pins $g_1$ and $g_2$, which project outwards through oblique guiding slots $h_1$ and $h_2$ provided in the detachable rim flange $c$. By means of an appliance to be hereinafter described, the distance between the pins $g_1$ and $g_2$, and consequently the diameter of the locking ring $f$ can be altered. In one position, shown in Figure 1 in full lines, the ring $f$ lies in the locking groove $d$, and engages over the joint $i$ (Fig. 1) between the two rim members $a$ and $c$, and thereby locks the rim flange $c$. When the distance between the two pins $g_1$ and $g_2$ is increased, the ring $f$ passes wholly into the space $j$ and releases the joint $i$, so that the rim flange $c$ can be taken off.

For the purpose of holding the pins $g_1$ and $g_2$ firmly in the locking position indicated by full lines there serves a locking plate $m$, which is rotatably secured by means of a bolt $n$ to the removable rim flange $c$. In the locking position this plate covers up the guiding slots $h_1$ and $h_2$, and is provided with recesses $o_1$ and $o_2$ (Fig. 2), into which the pins $g_1$ and $g_2$ drop when the ring $f$ is contracted to the smaller diameter, and the plate $m$ rocked into the locking position. The tangential pull of the resilient steel ring $f$ holds the pins $g_1$ and $g_2$ firmly in the recesses $o_1$ and $o_2$. Upon the rim flange $c$ being removed, the distance between the pins $g_1$ and $g_2$ is first slightly diminished and then the locking plate $m$ is rocked, so that it releases the pins $g_1$ and $g_2$. In consequence of its elasticity the ring $f$ now expands and sets free the rim flange $c$.

The pins $g_1$ and $g_2$ are provided in the neighbourhood of their ends with collars $p$ (Fig. 1), under which the locking plate $m$ engages, when brought into the locking position.

For the purpose of altering the distance between the pins $g_1$ and $g_2$, and consequently the diameter of the open steel ring $f$, there serves the key illustrated in Fig. 3, which consists of a long lever $q$ and a short lever $r$, which are connected with one another by means of a pin joint $s$. At the ends of these levers are provided recesses $t$ adapted to be mounted upon the pins $g_1$ and $g_2$ of the ring $f$. By rocking the lever $q$, when the locking plate $m$ is rocked back, the distance between the pins $g_1$ and $g_2$ is reduced, and thereupon the locking plate $m$ is rotated back into the locking position. The key $q$, $r$ can obviously also be utilized for the purpose of pressing the pins $g_1$ and $g_2$ away from one another if the elasticity of the ring $f$ should prove insufficient for this purpose.

In order to prevent the key from slipping off the pins $g_1$ and $g_2$, which have to be kept as short as possible, the latter are turned conically, and the apertures $t$ in the lever $q$, $r$ are correspondingly under-cut in dovetail form, as shown in Figure 1.

What we claim is:—

1. A divided rim for the wheels of automobiles, comprising a removable rim flange formed with two oblique guiding slots and with an annular groove opening inwards, a fixed rim part formed with an annular groove opening outwards and normally registering with the groove in the removable flange, an expansible locking ring normally engaging partly in one of said grooves and partly in the other and adapted to be withdrawn from the groove in the fixed rim member by having its diameter increased, pins fastened to the ends of the locking ring and projecting laterally through the guiding slots in the removable rim flange for the purpose of being actuated by a suitable key to alter the diameter of the ring, and a locking plate pivoted to the removable rim flange and adapted in one position to cover up the greater part of the guiding slots when the ring is in the locking position.

2. A divided rim for the wheels of automobiles, comprising a removable rim flange formed with two oblique guiding slots and with an annular groove opening inwards, a fixed rim part formed with an annular groove opening outwards and normally registering with the groove in the removable flange, an expansible locking ring normally engaging partly in one of said grooves and partly in the other and adapted to be withdrawn from the groove in the fixed rim member by having its diameter increased, pins fastened to the ends of the locking ring and projecting laterally through the guiding slots in the removable rim flange for the purpose of being actuated by a suitable key to alter the diameter of the ring, and a locking plate pivoted to the removable rim flange and adapted in one position to cover up the greater part of the guiding slots when the ring is in the locking position, said locking plate being formed with recesses into which the bent ends of the locking ring are drawn by the pull of the expansible ring when the ring and the plate are in the locking position.

3. A divided rim for the wheels of automobiles, comprising a removable rim flange formed with two oblique guiding slots and with an annular groove opening inwards, a fixed rim part formed with an annular groove opening outwards and normally registering with the groove in the removable flange, an expansible locking ring normally engaging partly in one of said grooves and partly in the other and adapted to be withdrawn from the groove in the fixed rim member by having its diameter increased, pins fastened to the ends of the locking ring and projecting laterally through the guiding slots in the removable rim flange for the purpose of being actuated by a suitable key to alter the diameter of the ring, undercut heads on the extremities of the bent ends of the locking ring, to facilitate secure engagement with said key, a locking plate pivoted to the removable rim flange and adapted in one position to cover up the greater part of the guiding slots when the ring is in the locking position, and collars on the bent ends of the locking ring, the locking plate being adapted to engage under said collars.

In testimony whereof we have signed our names to this specification.

EMIL ZIPPER.
WALTER ZIPPER.